United States Patent [19]
Dekel

[11] Patent Number: 4,894,776
[45] Date of Patent: Jan. 16, 1990

[54] BINARY SPACE INTERPOLATION

[75] Inventor: Doron Dekel, Haifa, Israel

[73] Assignee: Elscint Ltd., Haifa, Israel

[21] Appl. No.: 109,400

[22] Filed: Oct. 19, 1987

[30] Foreign Application Priority Data

Oct. 20, 1986 [IL] Israel .................................. 80364

[51] Int. Cl.$^4$ ...................... G06F 15/42; G06F 15/72; G06F 15/353
[52] U.S. Cl. ................................. 364/413.13; 340/725; 340/728; 364/413.18; 364/521; 382/6
[58] Field of Search ............... 340/728, 723, 724, 725; 364/521, 723, 413.13, 413.14, 413.16, 413.18; 378/901

[56] References Cited

U.S. PATENT DOCUMENTS 4,446,529 5/1984 Strolle .................................. 364/723

OTHER PUBLICATIONS

Kruger, R. et al., "A Digital Video Image Processor for Real-Time X-Ray Subtraction Imaging", Optical Engineering, vol. 17, No. 6, Nov./Dec. 1978, pp. 652-657.
Jain, R., "Dynamic Scene Analysis Using Pixel-Based Processors", IEEE Computer, Aug. 1981, pp. 12-18.
Chin, R. et al., "Automated Visual Inspection: A Survey", IEEE Trans on Pattern Analysis and Machine Intelligence, vol. PAMI-4, No. 6, Nov. 1982, pp. 557-573.
IEEE Computer Graphics and Applications, Goldwasser et al., "Physician's Workstation with Real-Time Performance", Dec. 1985, pp. 44-57.

Primary Examiner—Jerry Smith
Assistant Examiner—Stephen M. Baker
Attorney, Agent, or Firm—Sandler & Greenblum

[57] ABSTRACT

A process and system for constructing three dimensional images by acquiring two dimensional image data maps of two spaced apart planes and using binary interpolation to provide image data on planes between the two spaced apart planes. The acquired image data is first converted to "bit" data maps denoting whether an organ of interest, for example, occupies the elements of the spaced apart planes. The bit maps are used to obtain distance maps denoting where there is transition of values in each element of the bit maps. The distance maps and at least one of the bit maps are used to obtain bit values of interpolated planes between the spaced apart acquired planes for use in constructing three dimensional images.

18 Claims, 5 Drawing Sheets

KEY:
▨ '1' bit
☐ '0' bit

* some reasonable value. a good choice may be the distance in pixels between lopwer and upper maps.

BINARY SPACE INTERPOLATION

FIELD OF THE INVENTION

This invention is concerned with imaging processes and more particularly with unique binary interpolation processes used to obtain three-dimensional (3D) images with smooth surfaces in short time periods, with accuracy and fidelity when only partial three dimensional information is available in the form of tomographically acquired data.

BACKGROUND OF THE INVENTION

Computerized tomography by definition provides two dimensional (2D) images of planes (planar views) in a patient's body. Often times it is important for the viewer (diagnostician and/or doctor) to be able to obtain three-dimensional views rather than planar views of the interior of the patient's body. For example, in surgical procedures it is extremely helpful if the doctor can see a three-dimensional view of the interior of the body in the area of the operation. Prior to brain surgery which are supplemented by three-dimensional views elaborate measuring methods are used to increase the probability of a successful operation.

At present time the three-dimensional views are obtained either by special x-ray equipment such as for example disclosed in the U.S. Pat. No. 4,309,615 or by taking a sequence of tomographic views of the portion of the body of interest and subsequently processing these views to provide the desired three-dimensional view. See the article entitled "Display of 3D Information in Discrete 3D Scenes Produced by Computerized Tomography" by J. K. Udupa, published in The Proceedings of the IEEE, Vol. 71, No. 3, Mar. 83, pp 420–431 (including an extensive bibliography).

In the prior art, to acquire and display a 3D image of an organ using the regular 2D tomographic equipment, it is necessary to acquire a series of parallel slices to obtain surface values necessary to construct a 3D image. Thus, in the prior art a great many planar slices are acquired, the values of the pixels in the slices are used to find surface pixel values between the slices. The surface pixel values are used to project the 3D image.

In the latter example, there is a need to reduce the number of views in order to maximize throughout and to prevent the unnecessary exposure of the patient to radiation. As a result the number of views acquired are minimized and consequently the description of the shape of the organ of interest is not complete. Accordingly, there is a need to interpolate to obtain the organ's shape from the acquired partial data of the spaced apart planar views. The interpolation should ideally reconstruct the actual shape of the organ and practically reconstruct the actual shape with minimum deviations.

Since the shapes of internal body organs are highly irregular, with no simple mathematical description, prior known methods all have serious limitations such as a lack of fidelity and unnecessary artifacts.

Thus, it is the object of this invention to provide a reliable method of obtaining a full description of the shape of internal organs from a series of planar slices of those organs. The result of applying the process described is a three dimensional binary bit matrix, in which the regions of bits having "1" values correspond to regions of space occupied by the organs of interest, while regions of bits having "0" values correspond to unoccupied space. This 3-D matrix can then be used to present the structure of the organs to the interested viewer in forms, such as a shaded surface image, well known to those skilled in the art.

In addition to the need for an ambulance of views, a prior art problem is to locate the edge of the organ of interest. In general, thresholding is practiced to convert the originally acquired data into binary maps to determine the edges of the organs. Interpolation is then done between portions of the edges having opposite bit values. However, the functional values (not the binary values) of the given plane image are used for the interpolation between the planes. The interpolation acquired values are converted to binary maps using thresholding. Accordingly a prior art problem is the necessity of using threshold discriminators to convert the interpolated functional values to bit values. The prior art is also plagued with a "staircase" artifact in the images of the surface of the organ of interest.

BRIEF DESCRIPTION OF THE INVENTION

Thus, it is an object of the present invention to provide interpolation processes and systems for reconstructing three dimensional images from a plurality of planar slices; regardless of how the slices are acquired such as for example through the use of: (1) radio-active elements such as those emmiting gamma rays; (2) x-ray radiation; or (3) magnetic resonance systems. More particularly unique binary interpolation is used to isolate the organ of interest and to minimize the "staircase" artifact.

In accordance with the present invention a unique interpolation process is provided which is used to obtain high fidelity three-dimensional descriptions of volumes of interest in a subject, said process comprises the steps of:

detecting signals from at least two spaced apart planes in a subject, processing said detected signals to obtain images of said two spaced apart planes, said images comprising rows and columns of image values, each intersecting row and column corresponding to an integral area of said plane and said image value corresponding to a pixel value of said integral area, processing the image values of the two spaced apart images to obtain a first and a second bit map where for example "1" values correspond to locations occupied by the organ of interest and "0" values correspond to locations not occupied by the organ of interest, processing the bits in said first and second bit maps to obtain a logic exclusive-OR (XOR) bit map, using said XOR bit map and said first and second bit maps to obtain first and second distance maps, and using said first and second distance maps in conjunction with either one of said first or second bit maps to obtain bit values of interpolated planes between said first and second bit maps to thereby provide a full three-dimensional description of the volume of interest.

A feature of the invention includes using available regular 2D front end tomographic systems for acquiring the 3D image data.

BRIEF DESCRIPTION OF THE DRAWINGS

The above mentioned and other features and objects of the present invention will be better understood when considered in light of the following description of the invention made in conjunction with the accompanying drawings; wherein.

GENERAL DESCRIPTION

The following general description focuses on a system and a method for obtaining three-dimensional images particularly adapted for medical diagnostics using computerized tomographic (CT) systems such as x-ray CT systems, emission CT systems or nuclear magnetic resonance systems, for example. It should be understood that the system and method is equally applicable to volume imaging systems in general wherein planar imaging information is available for only some of the planes through the volume of interest.

Figure 1:
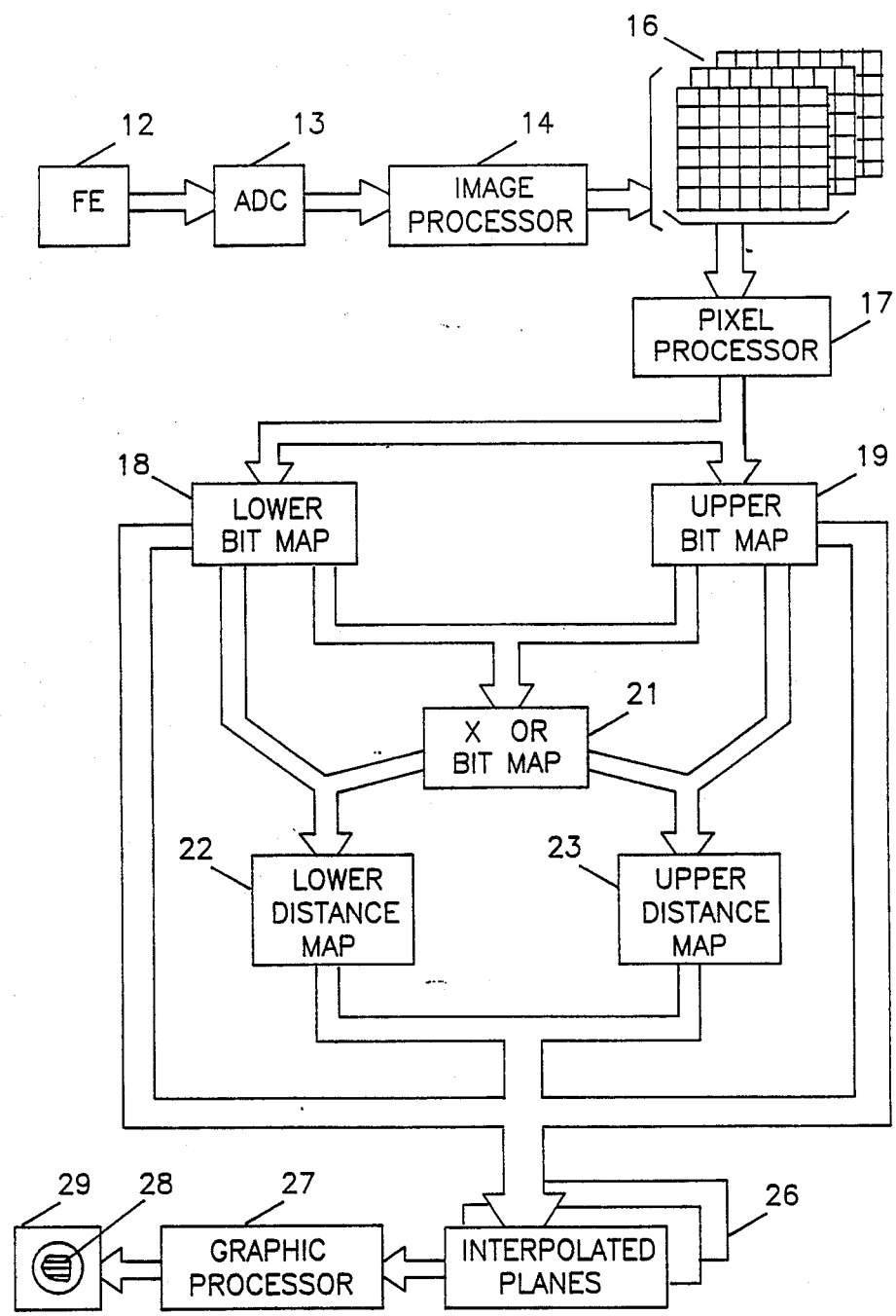
FIG. 1 is a combined block and flow diagram showing the inventive binary interpolation system.

The three dimensional imaging system 11 of FIG. 1 comprises a front end system 12 for detecting signals from specific locations in a subject being examined. The signals are obtained using an x-ray CT system, for example, when the oppositely disposed radiation source and detectors rotate about the patient and provide radiation intensity values for a multiplicity of radiation paths in a plane through the patient. Well known techniques are used in processing the detected radiation to define elemental area location of radiation absoption values within the patient. The original signal from the front end is normally analog; therefore, an analog to digital converter (ADC) 13 is preferably provided to convert the signals to digital form. An image processor 14 uses the digital signals and determines the absorption values of the elemental area locations in the plane by back-projection methods, for example. An image is provided comprising a matrix of rows and columns in which the values correspond to the values of the elemental area in the plane through the patient and to pixel locations in the actual display image.

For the three-dimensional processing described herein at least two images are obtained by moving the subject relative to the radiation source and detector means to obtain image data on more than one plane. In practical usage a plurality of planes are imaged and interpolation is done between successively images planes. The planes are spaced apart and it is the volume between the planes that will be imaged in three-dimensional form. The multiplicity of images are shown at 16. A pixel processor 17, which in a preferred embodiment uses a threshold discriminator and a specific area discriminator, or manual contour tracing, converts the pixels into bits having values of zero and one. The spaced apart planes are thus converted to a lower image bit map 18 and an upper image bit map 19.

According to the present invention, an XOR bit map shown at 21 is provided from the bits of the lower and upper image bit maps. Thus, if both of the upper and lower bit maps having the same binary value at a matrix location, that location is given a "0" value in the XOR bit maps, otherwise, that location is given a "1" value. The XOR bit map is then used in combination with the lower bit map and the upper image bit map to obtain a lower distance map 22 and an upper distance map 23. A distance map shows the length of the shortest path lying entirely within the XOR bit map from the center of a bit to the edge of a bit with the opposite value on the corresponding map (upper or lower). The path goes only through centers of neighboring bits on the corresponding map.

There is no limit on the number of interpolated planes that can be obtained by this method. In the simplified explanation presented herein three interpolated planes are obtained. They are the planes located at one quarter of the distance, half the distance and three quarters of the distance between the two spaced apart image planes. In actual practice the number of interpolated planes is such that the distance between planes is equal to the distance between neighboring pixels within the planes. The interpolated planes contain bit values in each of the elemental areas. The collection of sequential planes thus obtained forms a volume defining "description" of the imaged "organ" (organ, bone, tissue, body part etc.). This description is then processed using known techniques to obtain images of outer or inner surfaces of the organs or to measure various spatial (3D) properties such as volumes, angles and distances.

Figure 2:
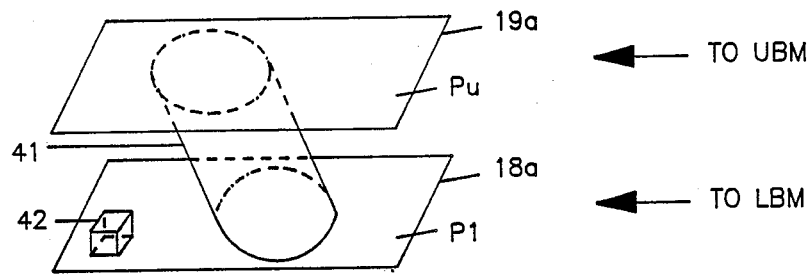
FIG. 2 is a pictorial showing of a three dimensional object used as example to explain the invention and showing exemplary upper and lower image planes.

The sample solids 41 and 42 of FIG. 2 are shown as being located between lower and upper bit map planes 18a and 19a respectively. The volume 41 is shown as a skewed cylinder while the volume 42 is a cubical volume intersected only by the lower bit map plane 18a.

Figure 3:
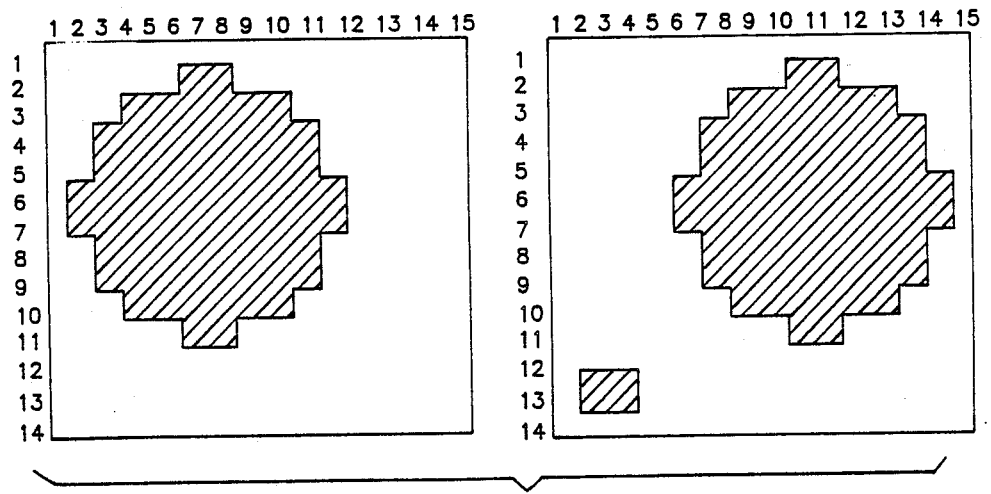
FIG. 3 shows exemplary upper and lower bit maps.
Figure 4:
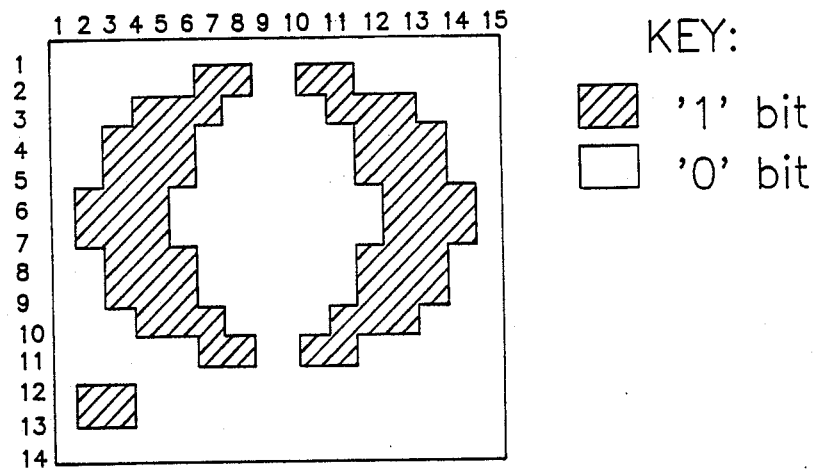
FIG. 4 shows a logic exclusive-OR (XOR) map made from the upper and lower bit maps of FIG. 3.
Figure 5A:
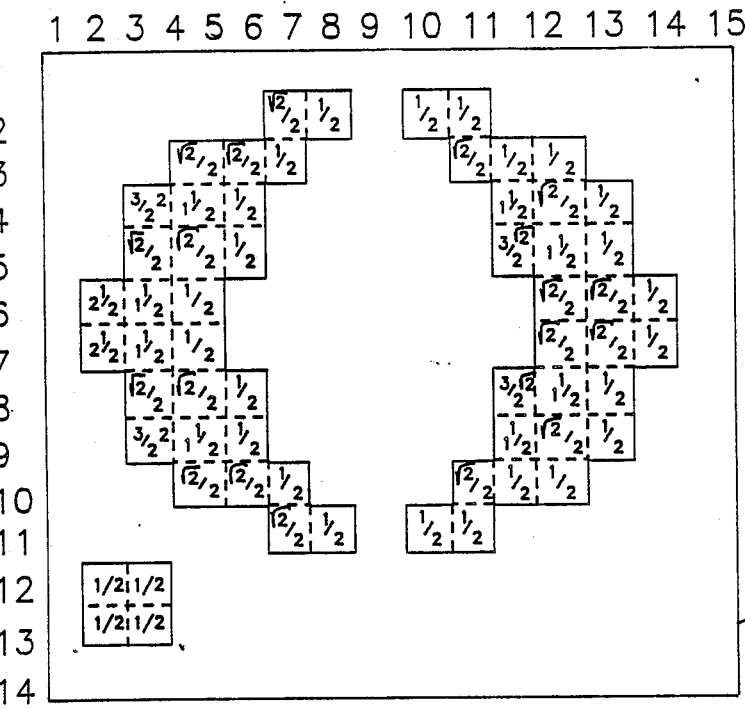
FIG. 5 shows exemplary upper and lower distance maps made from the upper and lower bit maps of FIG. 3 and the XOR map of FIG. 4.
Figure 5B:
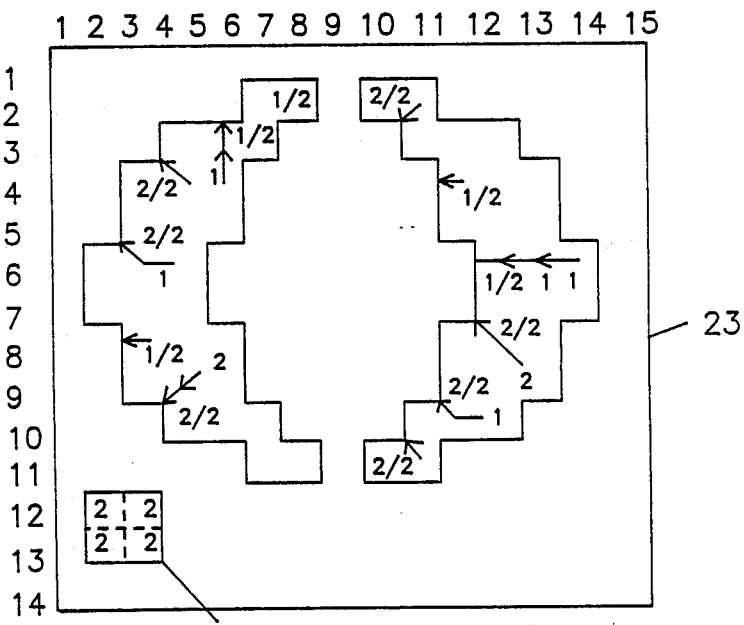

In FIG. 3 the lower bit map 18 and the upper bit map 19 are shown by way of example only, as matrices of fifteen columns and fourteen rows having bit values thereon. The bit values "0" indicate no contact by the transverse planes Pu and PL with volumes 41 or 42. The bit values '1' indicate contact with volumes 41 or 42. Corresponding bit values are used to create the XOR map 21 of FIG. 4. For example, in column 6, row 2 the bit value of the lower bit map is "0" while the bit value in the upper bit map is "1". Thus, the XOR bit map value for that location is "1". Similarly, in column 8, row 2 of both the upper and lower bit maps, the bit value is "0"; therefore, the corresponding row and column in the XOR bit map is "0". Similarly in column 10, row 2 the bit values of the lower bit map is "1" while the value of the upper bit map is "0"; accordingly, the bit value of the XOR bit map for that location is "1". As a final example, in column 8 line 3 the bit value of both maps is 1; therefore the bit values of the XOR bit map is "0".

With the XOR bit map and each of the lower and the upper image bit maps a lower distance map and a upper distance map, respectively, are derived. For example the bit value of the fourth row, fourth column of the XOR bit map 21 is one. The bit value of the corresponding location in the lower bit map is zero. The closest bit value on the lower bit map corresponding to the bit value of the XOR map is at a distance of 1½. More particularly the distances are measured from the center of the matrix area to the border of the closest matrix area having the opposite bit value in the corresponding (upper or lower) bit map. The shortest distance across each matrix area is one. The diagonal distance from the center of the matrix to a corner of the matrix is $\sqrt{2}/2$. The distance is measured along a path that goes only through the centers of matrix areas that have a "1"

value on the XOR bit map. Looking at the lower bit map, it is easy to see that the distance from the center of the matrix area of the second row, seventh column to a matrix area having the value "1" is the distance to the matrix area located at the second row in column eight. That distance is ½. Similarily the shortest distance from the fifth row of the eleventh column in the lower bit map 18 area having an opposite value "0" is 1 plus $\sqrt{2}/2$ or $(3/2)\sqrt{2}$. In a similar manner every area of the XOR bit map that has a value "1" is applied to the lower and upper bit maps 18 and 19 to determine lower and upper distance maps 22 and 23.

Thus, the search looks at the area on the upper and lower bit maps that correspond to areas in the XOR map that have a "1" value. Then, the length of the shortest path, lying entirely within the XOR map 21 from the center of a bit area to the edge of a bit area with the opposite value in the corresponding map, is entered for each such area in the appropriate distance map 22 or 23. In case no such path exists as in the 13th row of the second column in the upper distance map 23 some reasonable constant value is entered. It has been found that the distance between the upper and lower planes in matrix units gives good results.

The distance values are used to obtain the interpolated bit maps. Thus, for example to obtain the bit values for the interpolated bit map 26b that is half way between the upper and lower bit maps, the lower distance and the upper distance maps are used as determinative of the change-over or transition point between the lower bit map value and the upper bit map values according to the following equation:

$$Dco = [DL/(Du+DL)]Dt$$

where:

Dco is the change over or transition distance from the lower plane,

Du is the distance indicated on the upper distance maps,

DL is the distance indicated on the lower distance map, and

DT is the distance between the upper plane and the lower plane.

Figure 6:
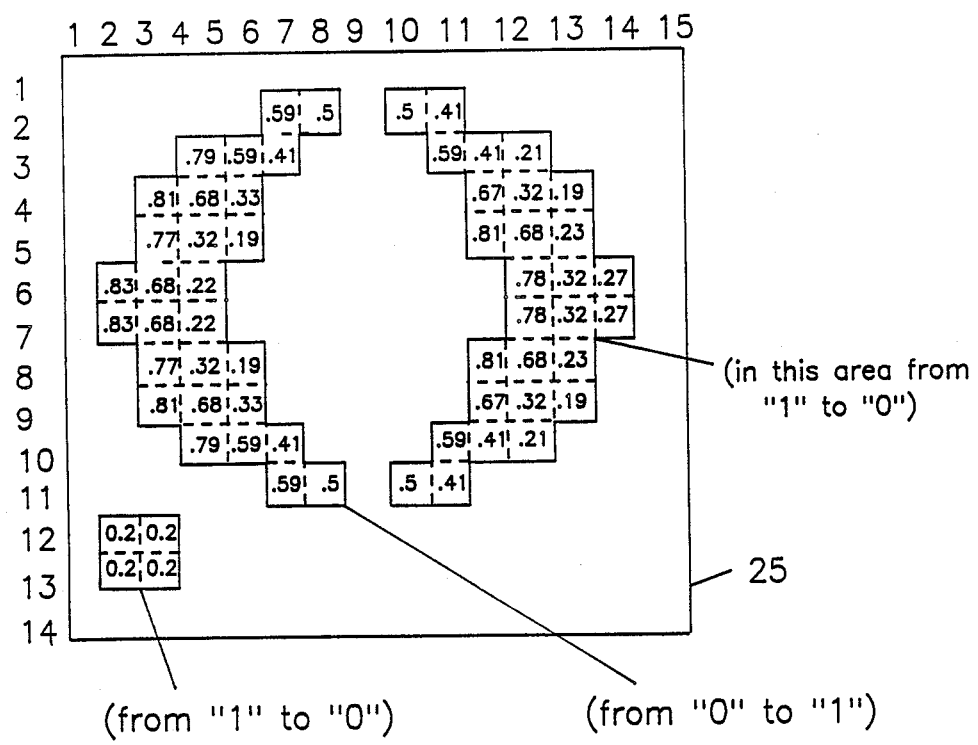
FIGS. 6a–6c show a bit value change over fraction map.
Figure 7A:
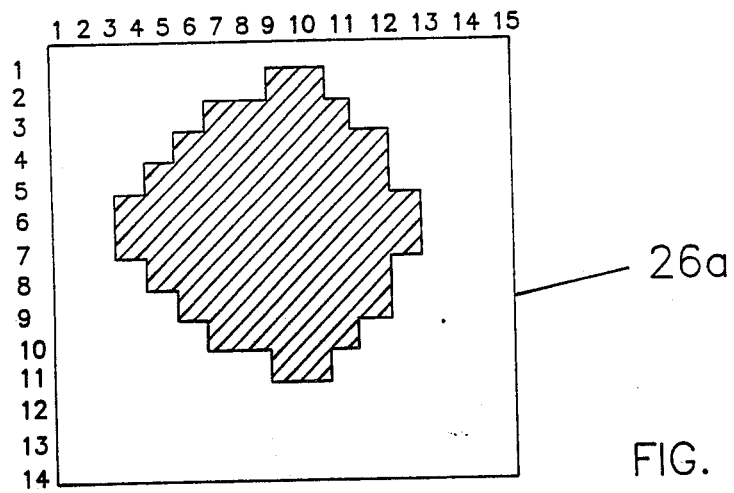
FIGS. 7a–7c show three exemplary interpolated bit maps located between the upper and lower bit maps.
Figure 7B:
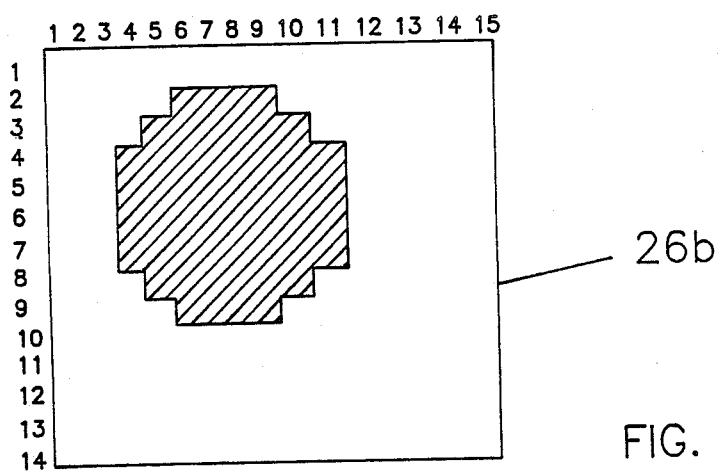
Figure 7C:
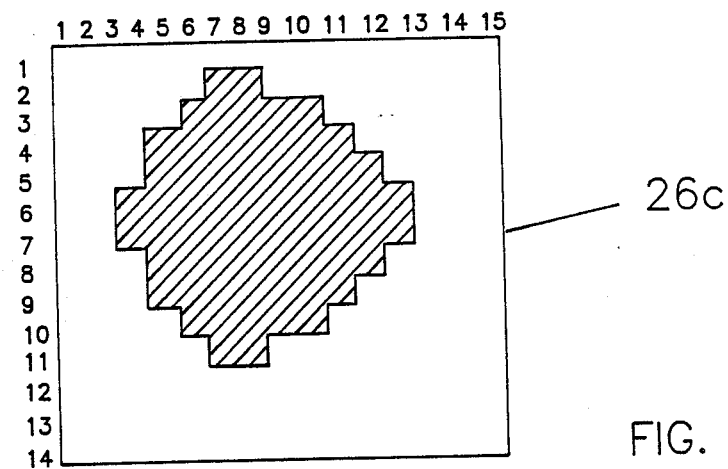

For example the fourth row, fourth column of the lower bit map has a bit value of "0". The corresponding area; that is the fourth row, fourth column of the upper bit map has a bit value of "1". The lower distance map corresponding matrix area has a value 3/2. The upper distance map at that matrix area has a value of $\sqrt{2}/2$. The change over point from "1" to "0" is $[1.5/(1.5+0.70)]Dt$ or 0.68 Dt. Anything within 0.68 of the distance between the lower bit map and the upper bit has the bit value of "0" and anything at a greater distance has the value "1". At locations where the corresponding bit valve in the XOR map is "0", the value generated for all the interpolated planes is the same as in either the upper or the lower bit map (which should be equal). The change over fraction map 25 of FIG. 6 gives the change over fraction DL/(DL+Du) as for the example described.

In this manner any number of interpolated planes or maps can be derived from each two spaced apart sequential plane images. Once all the interpolated planes are derived, the three-dimensional binary matrix holds a full description of the body, or bodies, of interest. Methods well known to those skilled in the art are used to product 3D shaded images from the acquired and interpolated data. For example the locations of the occupied ("1") bit areas in the matrix can be multiplied by a rotation matrix and projected onto a two-dimensional plane, to create a surface image 28 of the body in a given rotational angle. That image can then be displayed on the display unit 29.

It should be mentioned also, that since the process described transforms a given group of edge contours to another in any number of intermediary steps, it can also be used in computerized animation sequences. The animator does not have to create all the necessary images in a sequence directly. Using this process, the computer can interpolate missing images in the animation sequence.

While the invention has been described with reference to exemplary embodiments, it should be understood that these embodiments are described by way of example only and not as a limitation on the scope of the invention which is defined by the accompanying claims.

What is claimed is:

1. A process for constructing three dimensional images of an object in a body being imaged, said process comprising the steps of:

acquiring two dimensional maps of image data of two spaced apart planes in the interior of said body, interpolating the acquired image data to provide image data for a plurality of planes between said spaced apart planes, said interpolating step comprising:

converting said maps of image data of said spaced apart planes to spaced apart binary bit maps where a presence of said image data of said object is indicated by one binary value and a lack of said image data of said object, is indicated by the other binary value, said one binary value indicating the interception of the object by a plane of said spaced apart planes, and the other binary value indicating the non-interception of the object by a plane of said spaced apart planes said image data comprising intersecting rows and columns of image values, each intersecting row and column representing a corresponding element of said planes and a corresponding pixel of said image, determining corresponding elements of each of said spaced apart planes with different binary values, determining the distance from one of said spaced apart planes to where there is a transition of binary values between said corresponding elements, using said distance to provide interpolated binary data for said planes between said spaced apart planes, converting said interpolated binary data to interpolated image data, and using said acquired image data of said spaced apart planes and said interpolated image data of said planes between said spaced apart planes to provide three dimensional images.

2. A process for constructing three dimensional images, said process comprising the steps of:

acquiring two dimensional maps of image data from two spaced apart planes in the interior of a body, interpolating the acquired image data to provide image data for a plurality of planes between said spaced apart planes, said interpolating step comprising the steps of:

converting said maps of image data from said spaced apart planes to spaced apart bit maps, said image data comprising intersecting rows and columns of image values, each intersecting row and column representing a corresponding element of said planes and a corresponding pixel of said image, determining corresponding elements of each of said spaced apart planes with different bit values, said step of determining corresponding elements with different bit values comprising the step of processing the bits in said spaced apart bit maps to obtain an Exclusive-OR(XOR) bit map, determining the distance from one of said spaced apart planes to where there is a transition of values between said different bit values in corresponding elements, using said distance to provide interpolated bit data for the planes between said spaced apart planes, converting said interpolated bit data to interpolated image data, and using said acquired image data of said spaced apart planes and said interpolated image data on said planes between said spaced apart planes to provide three dimensional images.

3. The process of claim 2 wherein said step of determining the distance to a transition of values comprises:

determining the shortest distances from elements on each of said bit maps, where there is a different bit value in the corresponding element of the spaced apart bit map to an element where there is a different bit value on the same bit map.

4. The process of claim 3 wherein the step of determining the distance to a transition of values further includes:

constructing a distance map of the distance determined on each of said spaced apart bit maps, finding the transition distance according to the equation:

$$Dco = [DL/(Du+DL)]Dt$$

where:

Dco is the transition distance from one of said spaced apart planes;

Du is the distance indicated on the distance map associated with the other of said spaced apart planes, such as an upper plane, for example, DL is the distance indicated on the distance map associated with the said one of the spaced apart planes, such as a lower plane, for example, and Dt is the distance between the two spaced apart planes.

5. The process of claim 2 wherein the step of determining the distance to a transition value comprises:

constructing a first distance map and a second distance map, where each of said distance maps comprises the distance from each element therein having a different bit value in a corresponding element of the other of said spaced apart bit maps to the closest opposite bit value on the same bit map.

6. The process of claim 5 wherein the distance is determined by the ratio between a local distance in the one bit map and the sum of a local distance of the other bit map and the one bit map multiplied by the total distance between the spaced apart planes.

7. The process of claim 6 wherein the local distances are measured from the center of each corresponding element having a different bit value to the border of the closest element on the same bit maps having a different bit value along lines extending from the center of each element to the center of an adjoining element.

8. A binary space interpolation process for reconstructing three-dimensional images from a plurality of spaced apart planar images, said process comprising the steps of:

detecting signals which are a function of characteristics of the interior of a subject from first and second spaced apart planes in said subject;

processing said detected signals to obtain images of each of said planes, said images each comprising intersecting rows and columns of image values;

each intersecting row and column corresponding to an integral area of a corresponding one of said planes, said image values corresponding to pixel values of corresponding pixels of said integral areas;

processing the image values in said two spaced apart images corresponding to the two said spaced apart planes to obtain a first and a second bit map, processing the bits in said first and second bit maps to obtain an XOR bit map, using said XOR bit map and said first and second bit maps to obtain first and second distance maps, and using said first and second distance maps to obtain image values of interpolated planes between said two spaced apart images to provide three-dimensional images.

9. A binary space interpolation process for constructing image positions between time spaced apart image positions of a subject, said process comprising the steps of:

acquiring signals which represent the subject in first and second time spaced apart positions, processing said obtained signals to obtain images, said images comprising intersecting rows and columns of acquired image values, each intersecting row and column corresponding to an integral area of said time spaced apart images, said image values also corresponding to pixel values of corresponding pixels of said images, interpolating the acquired image values to provide image values at corresponding integral areas on a plurality of time spaced apart positions between said first and second time spaced apart positions, processing the image values from said first and second time spaced apart positions corresponding to first and second time spaced apart planes to obtain a first binary bit map and a second binary bit map, said first binary bit map and said second binary bit map each having aligned elements of said first and second image positions, respectively;

processing the binary bit values in said first and second binary bit maps to determine elements having different binary bit values, one binary bit value indicating the intersection of the subject by the element of the plane containing the binary bit value and the other binary bit value indicating the lack of intersection of the subject by the element of the plane containing the binary bit value;

determining distances from said first binary bit map along imaginary straight lines connecting said aligned elements to the position between said first and second time spaced apart positions where there is a value transition due to said different binary bit values;

using said determined distances to obtain interpolated binary bit values for said plurality of time spaced apart positions between said time spaced apart images, and using said interpolated binary bit values between said time spaced apart images and said acquired binary bit values in said first and second binary bit maps to provide interpolated image values which can be used for animation.

10. A system for constructing three dimensional images of an object in a body being imaged, said system comprising:

means for acquiring two dimensional maps of image data of two spaced apart planes in the interior of said body, means for interpolating the acquired image data to provide image data for a plurality of planes between said spaced apart planes, said means for interpolating comprising:

means for converting said maps of image data of said spaced apart planes to spaced apart binary bit maps, said image data comprising intersecting rows and columns of image values, each intersecting row and column representing a corresponding element of said planes and a corresponding pixel of said image, means for determining corresponding elements of each of said spaced apart planes with different binary bit values, said binary bit having one binary value when said plane intersects said object and having the other binary value when said plane fails to intersect said object, means for determining the distance from one of said spaced apart planes to where there is a transition of binary values between corresponding elements, means for using said distances to provide interpolated binary bit data for the planes between said spaced apart planes, means for converting said interpolated binary bit data to interpolated image data, and means for using said acquired image data of said spaced apart planes and said interpolated image data on the planes between said spaced apart planes to provide three dimensional images.

11. A system for constructing three dimensional images, said system comprising:

means for acquiring two dimensional image data maps of two spaced apart planes in the interior of a body, means for interpolating the acquired image data to provide image data for a plurality of planes between said spaced apart planes, said means for interpolating comprising:

means for converting said image data maps of said spaced apart planes to spaced apart bit maps, said image data comprising intersecting rows and column of image values, each intersecting row and column representing a corresponding element of said planes and a corresponding pixel of said image, means for determining corresponding elements of each of said spaced apart planes with different bit values, said means for determining corresponding elements with different bit values comprising means for processing the bits in said spaced apart bit maps to obtain a logic Exclusive-OR(XOR) bit map, means for determining the distance from one of said spaced apart planes to where there is a transition of values between bit values in said corresponding elements, means for using said distances to provide interpolated bit data for said planes between said spaced apart planes, means for converting said interpolated bit data to interpolated image data, and means for using said acquired image data of said spaced apart planes and said interpolated image data on said planes between said spaced apart planes to provide three dimensional images.

12. The system of claim 11 wherein said means for determining the distance to a transition of values comprises;

means for determining the shortest distances from elements on each of said bit maps where there is a different bit value in the corresponding element of the spaced apart bit map to an element where there is a different bit value on the same bit map.

13. The system of claim 12 wherein the means for determining the distance to a transition value further includes:

means for constructing a distance map of the distance determined on each of said spaced apart bit maps, means for finding the transition distance according to the equation:

$$Dco = [DL/(DU+DL)]Dt$$

where:

Dco is the transition distance from one of said spaced apart planes;

Du is the distance indicated on the distance map associated with the other of said spaced apart planes, DL is the distance indicated on the distance map associated with the said one of the spaced apart planes, and Dt is the distance between the two spaced apart planes.

14. The system of claim 11 wherein the means of determining the distance to a transition value comprises:

means for constructing a first distance map and a second distance map, where each distance map comprises the distance from each element having a different bit value in a corresponding element of the other of said spaced apart bit maps to the opposite bit value on the same bit map where said each element is located.

15. The system of claim 14 wherein the transition distance is determined by the ratio between a local distance in the one bit map and the sum of a local distance of the other bit map and the one bit map multiplied by the total distance between the spaced apart planes.

16. The system of claim 15 wherein the local distances are measured from the centre of each corresponding element having a different bit value to the border of the closest element on the same bit map having a different bit value along lines extending from the center of each element to the center of an adjoining element.

17. A binary space interpolation system for reconstructing three-dimensional images from a plurality of spaced apart planar images, said system comprising:

means for detecting signals which are a function of characteristics of the interior of a subject from first and second spaced apart planes in the said subject;

means for processing said detected signals to obtain images of each of said planes, said images each comprising intersecting rows and columns of image values, each intersecting row and column corresponding to an integral area of a corresponding one of said planes, said image values corresponding to pixel values of corresponding pixels of said integral areas;

means for processing the image values in said two spaced apart images corresponding to the two said spaced apart planes to obtain a first and second bit map, means for processing the bits in said first and second bit maps to obtain an XOR bit map, means for combining said XOR bit map and said upper or lower bit maps to obtain upper and lower distance maps, and means for using said upper and lower distance maps to obtain image values of interpolated planes between said two spaced apart images to provide three-dimensional images.

18. A binary space interpolation system for constructing image planes between a first and a second time spaced apart image planes of a subject, said system comprising:

means for acquiring signals which represent said subject in first and in the second time spaced apart planes, means for processing said obtained signals to obtain images; said images comprising intersecting rows and columns of acquired image values, each intersecting row and column corresponding to an integral area of said time spaced apart planes, said image values also corresponding to pixel values of corresponding pixels of said images; means for interpolating the acquired image values to provide image values at corresponding integral areas on a plurality of planes between said first and second time spaced apart planes, means for processing the images values from said first and second spaced apart planes to obtain a first map of binary bit values and a second map of binary bit values, said first map and said second map each having aligned integral areas of said first and second image planes respectively;

a first of said binary values indicating the interception by the integral area of the plane containing the integral area with the subject and the other binary value indicating that the integral area of the plane failed to intercept the subject;

means for processing the binary bit values in said first and second binary bit maps to determine aligned integral areas having different binary bit values;

means for determining the distance from said first binary bit map along imaginary straight lines connecting said aligned integral areas to a plane between said first and second spaced apart planes where there is a value transition of said binary bit values;

means for using said determined distance to obtain interpolated binary bit values for different planes between said times spaced apart images, and means for using said interpolated binary bit values between said time spaced apart images to provide interpolated image values which can be used for animation.

* * * * *